INVENTOR.
ANTHONY J. CAPOZZI
BY Ronald J. Clark
ATTORNEY

United States Patent Office 3,431,558

Patented Mar. 4, 1969

3,431,558

DATA STORAGE SYSTEM EMPLOYING AN IMPROVED INDEXING TECHNIQUE THEREFOR

Anthony J. Capozzi, Binghamton, N.Y., assignor to International Business Machines Corporation, Armonk, N.Y., a corporation of New York Filed Aug. 4, 1966, Ser. No. 570,364

U.S. Cl. 340—172.5 11 Claims

Int. Cl. G11b *13/00*

ABSTRACT OF THE DISCLOSURE

This indexing system for a large capacity storage device is key oriented. Each data record in the system is identified by a key number. The key numbers are also stored in a second storage system in the same order and format as they occur in the first, large capacity, system. The second storage system is searched for the desired key number. As the search narrows to the key, the address of the record is developed. The position of the record in the first storage system corresponds to the position of the key in the second storage system. Means are provided to determine and keep track of the address being searched. When the key is located, this means contains the address corresponding to the location of the record in the first storage means. Since the high order bits of the address are determined first, it is possible to initiate movement of the access mechanism for the large capacity storage system before the complete address is derived.

This invention relates to bulk storage units employed in an electronic data processing system for the storing of signal indicia grouped together to form a plurality of records and, more particularly, to an indexing device for use with said bulk storage unit in order to facilitate the locating of a desired record when its hardware oriented address is unknown.

The need for larger and larger random access record storing units is evident in the data processing industry today. These large files bring new problems directed to the requirement for locating one of the many records therein. Each record includes an order determining number which has no relationship to the record. This number or address determines where in the file the associated record is held. Originally in tape systems, the proper address is found by sequentially searching each address until the correct address is found. The first advancement toward locating a record in a shorter time period is directed towards physically dividing the storage unit into segments, such as one disk surface in a disk file plus a plurality of tracks on each surface. Each track then stores a plurality of records by ascending record numbers. In this advanced type system, the record address includes a disk surface identifying number, a track number and a record number. Normally, each such number is found by a separate access mechanism. The disk surface is selected by electrically switching between magnetic pick up heads arranged as a comb with separate heads interleaving each disk surface, and the correct track is selected by moving the heads in or out and sensing the track movement by photocells and a light source. The record number is selected by a read-compare operation. One major disadvantage of the above-described system is that all the desired numbers must be kept track of during any operation with the file.

A random access storage unit is one wherein a large number of records are stored and wherein each record is almost immediately accessible due to some relative motion between the access mechanism and the storage medium. Additionally, the storage medium is subdivided into a plurality of groups of these records and one portion of the access mechanism is specially reserved for each group according to some predetermined assignment or sequence. An assignment would be given in the above-described system wherein one head is assigned to one disk surface and moves within that lesser portion of the entire storage unit. A sequencing arrangement is one wherein a head would move beyond one surface or physical division of its storage unit.

The recording medium may assume several configurations among which include optical, and magnetic, drum, strip and disk units. One specific embodiment disclosed herein is described with reference to a strip file, and a disk file combination wherein the strip file is the record storage medium and the disk file holds selected information by which individual records in the strip file are located. Another embodiment illustrates the novel indexing technique in a disk unit alone.

A further improvement in random access storage units contemplates the use of a key signal as the means of locating the desired record. This key signal is a non-order determining signal such as randomly assigned man numbers, outstanding insurance policy numbers, wherein there are a plurality of cancelled policy numbers which do not appear in the file. Existing systems place the highest key number on a disk surface in a first separate storage area and the highest key number on each track in a second separate storage area. The search routine scans through the first storage area to locate the correct disk surface number and then scans through the second storage area for those tracks on the single disk surface to locate the desired track number. Once the correct track was found then each record is searched for the desired key signal forming a separate distinct part of the record or forming any selected portion of the record. The separate storage areas for a large capacity random access storage unit having a capacity of approximately four hundred million bytes, IBM type 2321 (Data Cell Drive), is forty million bytes. The area reserved for those key number indices reduces the storage capacity of the random access storage unit by that amount. So although the use of these indices relieves the problem of keeping track of many hardware oriented addresses, their use reduces the storage capacity of the storage unit.

A second problem associated with large capaicty storage units is that their access time is usually longer than that associated with a smaller capacity storage unit. This difference is caused by the additional distance any access head must move or the different types of access mechanisms assigned to the larger units. The access time of a single record can be reduced by placing the indices on a faster operating storage unit or core memory or a combination thereof which in effect, as hereinafter is described in greater detail, masks the time it takes to move the access mechanisms associated with the larger storage unit.

Accordingly, it is an object of the present invention to provide an indexing technique for a bulk storage unit which reduces the time required to locate a record during a search on key operation.

It is another object of the present invention to provide an indexing technique for a bulk storage unit which reduces the storage capacity employed in storing key signal indices.

It is a further object of the present invention to provide an indexing technique for a bulk storage unit which employs a large capacity bulk storage unit for storing a plurality of records and employs a smaller capacity bulk storage circuit for storing key signal indices associated with said records in a manner so as to automatically generate the hardware oriented address of the desired record.

It is a still further object of the present invention to provide an indexing technique for a bulk storage unit which employs a multiple segment search operation, whereby the accessing time of the larger capacity bulk unit is completely or partially masked by its simultaneous operation with a portion of the multiple segment search operation.

It is another object of the present invention to provide an indexing technique for a bulk storage unit which provides separate storage areas for holding the high key signal or some other significant key signal for each physical subdivision of the storage unit or for each major physical subdivision of the storage unit or for any logical subdivision of the unit.

It is a further object of the present invention to provide an indexing technique for a bulk storage unit which provides separate storage areas for holding key signal indices comprising a key signal of a first division or portion of the storage unit followed immediately in blocked format by key signals of sub-divisions or sub-portions within the larger division.

Briefly, the invention contemplates the use of a core memory for storing the first level index signals and a disk unit as the means for storing the first division and subportion index signals. Once the first division and subportion index signal is correctly identified, the access mechanism for the larger capacity bulk storage unit is directed to locate this physical area. During this access time, the second level index signals are searched for the same key signal. Its location gives the access mechanism for the larger capacity bulk storage unit the remaining second portion of the hardware oriented address by which the desired record is located. This remaining address portion is generally received by the large capacity bulk storage unit prior to its finding the first level storage area.

The foregoing and other objects, features and advantages of the invention will be apparent from the following more particular description of preferred embodiments of the invention, as illustrated in the accompanying drawings; wherein FIG. 1 shows a generalized block diagram of a first embodiment of the instant invention;

FIG. 2*a* is a schematic view of a record in blocked format;

FIG. 2*b* is a more detailed view of the count field shown in FIG. 2*a*,

FIG. 2*c* is a schematic view of the second level index records;

FIG. 2*d* is a schematic view of a portion of a core storage area shown in FIG. 1;

The same numerals are used to identify the same elements in the several views.

Figure 1:
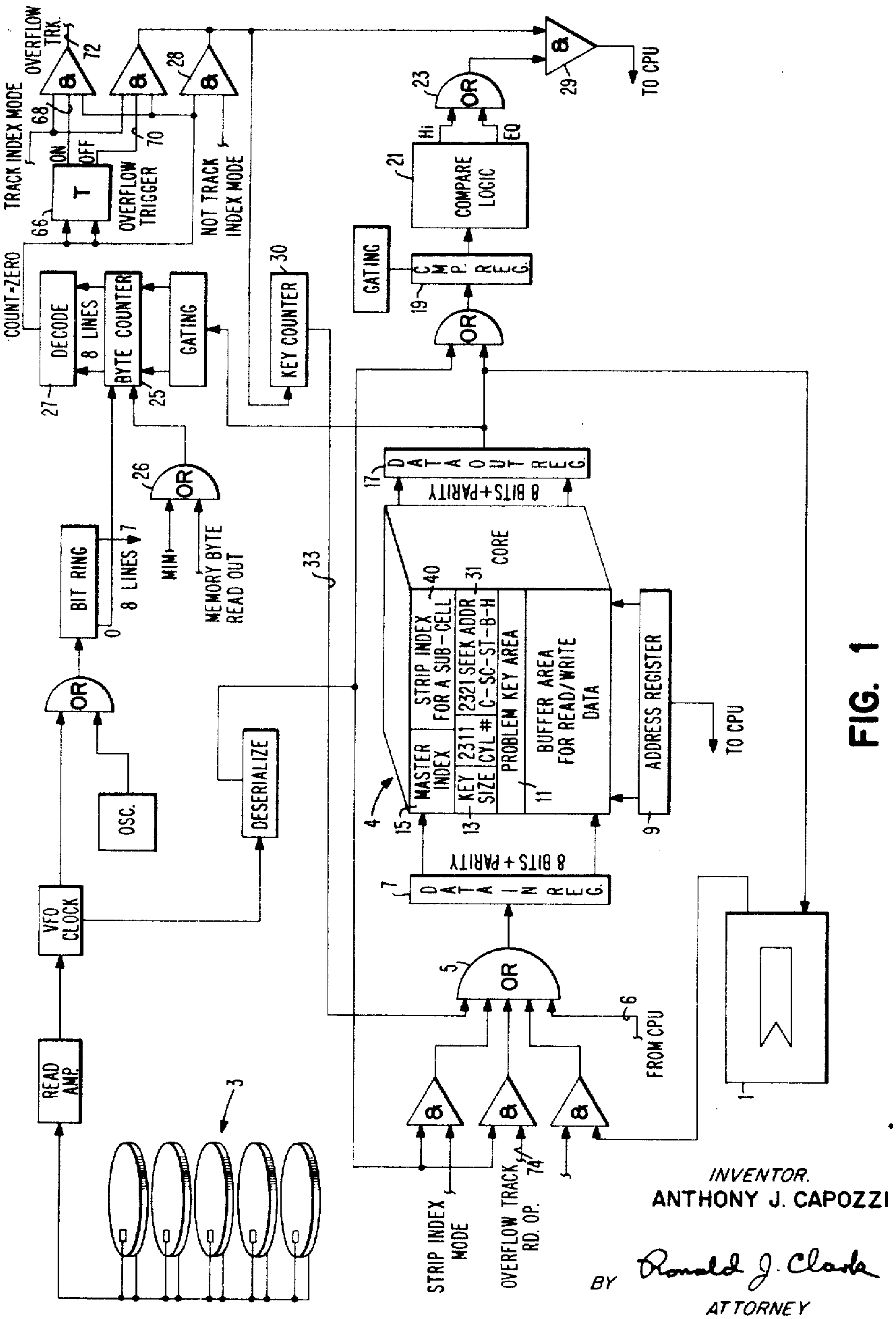

Referring to FIG. 1, there can be seen a generalized block diagram of the instant invention including a first large capacity bulk storage unit 1 such as the type IBM 2321 (Data Cell Drive) and a smaller capacity bulk storage unit 3 such as the IBM type 2311 (Disk Storage Drive). The storage format of the unit 1 is well known and includes a descending order of selection comprising cell, subcell, strip, bar and head. There are 20 head numbers in a single bar, 5 bars in a strip, 10 strips in a subcell, and 20 subcells in a cell and there can be 10 cells in the unit. The desired key which forms the basis of the record search operation is transferred from an associated CPU to a core storage unit 4 by an input assembler OR gate 5 and a plurality of CPU input lines 6. The assembler 5 transfers the data to a data in register 7 where it is written into the storage location address specified by an address register 9. Address indicia is furnished to the register 9 by the CPU. The desired key is loaded into a problem key area 11 of core storage 4 a byte at a time by the combined operation of the input assembler 5 and the address register 9 working in conjunction with the associated CPU. Additionally, the length of the key signal is loaded into a key size area 13 of core storage 4 by the same procedure.

A master index area 15 of core storage 4 has been previously loaded to contain the highest key number in each of the largest physical areas associated with the storage unit 1. In the case under description, this area is a cell area. Assuming that a particular key signal has been loaded into the problem key area 11 and the number of bytes in this particular key has been loaded into the key size area 13, the system is now caused to operate in the master index mode whereby the key signals in the master index storage area 15 are sequentially read and compared in the following manner. Under a scanning routine which can be controlled by microprogramming, the first key signal from the master index file is read out a byte at a time into an output register 17 and then to a compare register 19. Alternate read out cycles transfer the key signal a byte at a time from its assigned area 11 to the read out register 17. When the first byte of the key signal from the master index area is in the compare register 19 and the first byte of the problem key signal is in the read out register 17, both bytes are gated to the compare circuit 21 wherein a comparison circuit 23 indicates whether the byte signals compare or do not compare. The compare operation is well known as a high or equal compare operation. Each key in the master index is compared with the problem key until a compare high or equal signal is generated.

Prior to the beginning of the above-described search operation, the contents of the key size area 13 are loaded into a byte counter 25. This counter 25 then indicates the total length of the problem key which is forming the basis of our record search operation. After each succeeding byte is read from the master index area 15, the byte counter 25 decrements by one in response to a signal from an OR gate 26. The OR gate 26 has two input signals, one of which is the MASTER INDEX MODE (MIM) signal and the second of which is the MEMORY BYTE READ OUT signal. When the byte counter is decremented to 0, a decode circuit 27 is activated and is employed to generate an enabling signal for application to an AND gate 28. A second input signal to the AND gate 28 is a NOT TRACK INDEX MODE signal. Since the unit is operating in a MASTER INDEX MODE, the AND gate passes its input signal to an AND gate 29 for testing the output of the high-equal compare operation and passes its input signal to a key counter 30. The counter 25 is refilled each time it is decremented to its zero position. Each time the output of the high-equal compare circuit 23 is tested, the key counter 30 is incremented by one. When the high or equal condition is met, the contents of the key counter 30 co-operate to find the address of the cell in which the desired problem key is located or points to the address when some physical address scheme of the layout of the units 1 and 3 do not match as perfectly as in the present embodiment and a base address is required. In the present invention the key counter indicates the disk surface number in the associated unit 3 in which the key signal is stored. The contents of the key counter are transferred to a seek address location 31 in core storage 4 by way of a plurality of lines 33 and the input assembler 5.

Figure 2A:
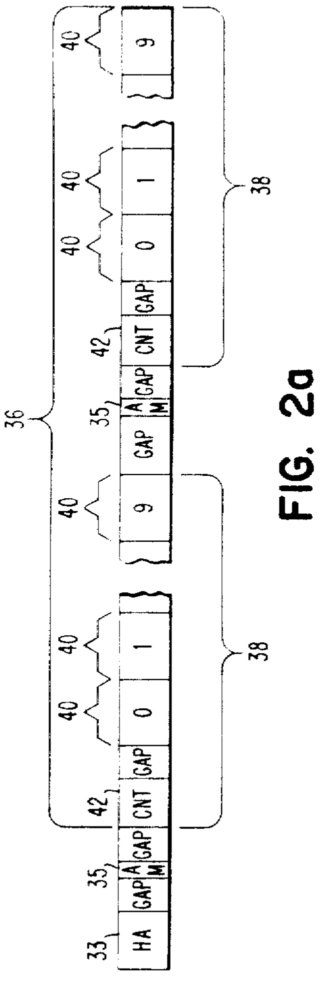

The physical configuration of a storage unit 3 includes a plurality of disk surfaces, which themselves each comprise a plurality of tracks. Corresponding tracks on each disk surface form a cylinder. The format of the records in the storage circuit 3 is as shown in FIG. 2*a*, wherein ten disk surfaces are employed to implement the instant invention and are numbered 0 through 9. Each disk surface holds the indices associated with one cell or the first major division of the unit 1. Track 1 of surface 1 includes in its format a home address area 33, and an address marker 35. The home address 33 is the hardware oriented address and includes the cylinder number and track number associated with a track format 36. The address marker 35 indicates that meaningful data is immediately upcoming. The elements 33 and 35 are mentioned only for completeness and form no part of the instant invention beyond their use by the accessing mechanism of the unit 3 in locating the first record on the disk surface indicated by the contents of the location 31 as determined by the key counter 30.

Since there are twenty subcells in a cell, the track format 36 is subdivided into twenty record 38. Since there are ten strips in a subcell, each record 38 comprises ten sub-records 40 arranged in blocked format. Blocked format refers to sub-records arranged sequentially with no gaps therebetween. Additional counters are employed to identify the sub-records.

Figure 2B:
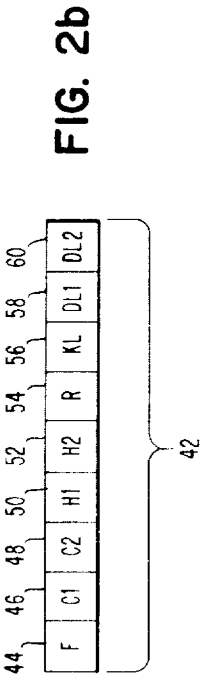

A more detailed view of a count field 42 in shown in FIG. 2*b*. The count field 42 is shown preceeding the sub-records in each record 38 and comprises a flag byte 44 which does not enter into the operation of the present invention. A C1 byte 46 contains the cylinder number of the unit 3 in which the next level index is stored. In the present embodiment this is the track indices for a strip. A C2 byte 48 contains the cylinder number in which the record is written. The H1 and H2 bytes 50 and 52, respectively, give the head number of the access mechanism, which is reading the present record. The R byte 54 contains the record number or sub-cell number within the track format being searched. More specifically, there are twenty records 38 in a track format 36 and each of the records is identified by a consecutively increasing record number in the byte position 54. The KL byte 56 does not enter into the operation of the instant invention since cell key signal areas have a common length, which length is specified by the contents of the area 13 in the core 4. Any shorter length key merely contains zeros or some other skip character into its high or low order positions which are not filled by the key signal. The DL1 and DL2 bytes 58 and 60, respectively, contain the total number of bytes in the record area 38.

Once the search of the Master Index has been successfully, completed and a cell number has been found, the circuitry switches in response to this completion to a STRIP INDEX MODE or FIRST DIVISION mode of operation for the search of the records in the format 36. Once the address marker 35 is detected, the record number in the count field of the subsequent record is read into the 2321 seek address location 31 of core storage 4. This record number, as previously mentioned, defines the subcell number of the cell whose index will now be read and compared. After the count field is read, the byte cunter 25 is again set to the key length, given by the contents of the key size area 13. All key lengths are assumed to be the same length. As each byte is received and compared in the compare logic with the contents of the problem key area 11, the byte counter decrements until the decode circuit 27 recognizes a zero condition thereby causing a testing of the output of the compare circuit and the incrementing of the key counter 30. While the contents of a track 36 are being compared, it is also stored in a strip index storage area 40. This operation is performed because a large majority of file work is done on a sequential key signal. Therefore, when one key signal is found, there is a good probability that the next key signal to be found may be in the same record area 38. This search could be completed at a much faster rate since the information would be in a core storage area, such as 40. As is seen in greater detail in the second embodiment, a search of this area 40 can be done prior to the remaining search operation as a step in reducing the time required to find the key signal. The key comparison operation continues until the testing of the compare circuit 23 indicates a high or equal condition. After this occurs, the contents of the key counter 30 now represent the strip number in which the desired record is located and the R2 byte 54 gives the subcell number in which the key signal is located. The subcell number represents a portion of an address describing a first division storage area and the strip number represents the remaining portion of the first division address. In the present embodiment the C1 byte 46 represents a new cylinder number in the unit 3 and the strip number selects one of the plurality of magnetic heads in the unit 3 after the cylinder has been reached and identified.

At this stage of the key index searching operation, the cell number, subcell number and strip number in the storage unit 1 is known in which the desired record is kept. At this time, the access mechanism of the storage unit 1 is set into motion toward this subdivision which has already been identified. Simultaneously, the access mechanism of the storage area 3 is also placed in motion towards the cylinder number identified by the C1 byte in the count field. The contents of the key counter 30 is employed to select the correct track in the cylinder. The circuitry also changes into its TRACK INDEX mode or SUB-PORTION mode of operation.

Figure 2C:
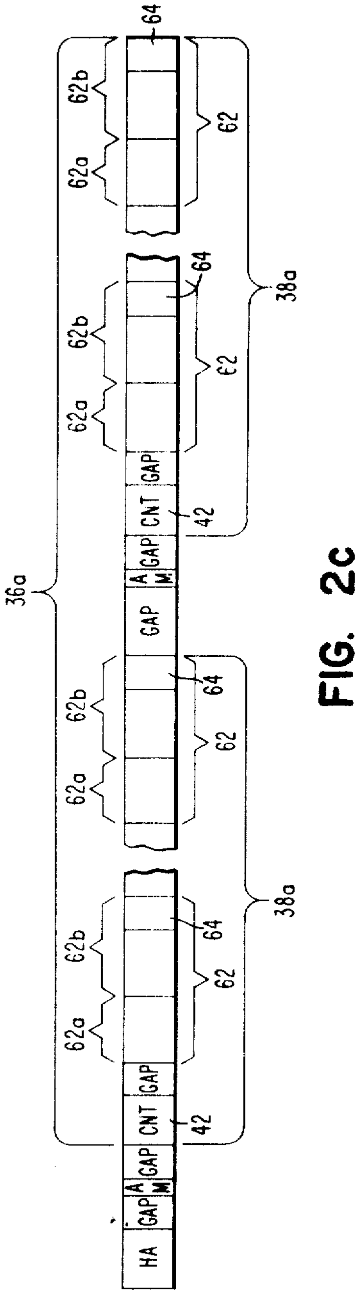

The format of the cylinder to which the access mechanism of the unit 3 has just been moved is generally the same as the format shown in FIG. 2*b* except for a few modifications illustrated in FIG. 2*c*. Since there are five bars in a strip, there are five records **38*a* in each track format 36*a*. Since there are eighteen heads or tracks in each bar reserved for data and two additional heads or tracks reserved for record overflow operations, there are eighteen sub-records 62 within each record 38*a*. Each of the sub-records are divided into half records 62*a* and 62*b*. The half records 62*a* contain the highest key on its corresponding track or head and the half record 62*b* gives the highest key signal which overflowed that track or head plus indicia 64 to identify the track or head number at which the overflow information can be found. As in the first division search operation, the R byte 54 of the count field 42 gives the bar number of the unit 1 to be accessed. This number is stored in the area 31 as it is read from the track. If the compare operation does not indicate a high or equal compare operation, the number is replaced by the next R byte 54 of the next sequential record 38*a*. The KL byte 56 is set to ZERO as it does not enter the operation of the instant invention. When a high or equal compare operation is indicated the contents of the key counter 30 now represent the track or head number in which the desired key signal is stored. This track number is also transferred to the storage area 31 and then both the bar number and track or head number are transferred to the accessing mechanism of the unit 1 to complete the addressing of the smallest subdivision within the unit 3**. A standard search on key and read key and data or read data or any other standard file operation can then be performed on the identified key and data record.

Figure 2D:
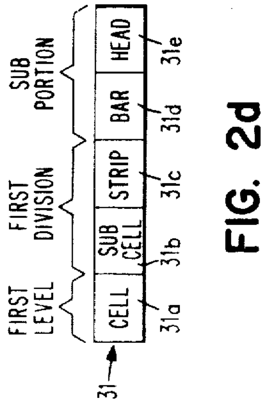

In greater detail, the area 31 of the core storage unit 4 is schematically shown in FIG. 2*d*. A cell portion **31*a* is filled by standard read/write techniques as a result of the search through the master index area 15. The R byte 54 of the count field 42 in the track format 36 gives the subcell address information in the area 31*b*. If a favorable compare operation is not reached on the first record 38 during the strip index mode the R byte 54 of the next record 38 replaces the early R byte address. Once a favorable compare operation is completed in the strip index mode or first division mode of operation, the contents of the byte counter 25 are applied to a strip address area 31*c***.

In the track index mode of operation, the contents of a bar address area **31*d* are furnished by the R byte 54 associated with the count field 42 in the track format 36*a*. During this track index mode, the contents of a head address area 31***e* are furnished by the byte counter 25.

Referring again to FIG. 1, during the TRACK INDEX MODE a trigger circuit 66 alternates in generating an enabling signal on its pair of output lines 68 and 70. The circuit 66 responds to the output signal of the decode circuit 27. Referring again to FIG. 2*c*, there can be seen the division of the sub-records 62 into a portion 62*a* holding the highest key on a track and a portion 62*b* holding the highest key signal which overflowed that track and the indicia 64 required to find that track. The trigger 66 identifies the half records 62*a* and 62*b* by its two output signals 70 and 68 respectively. When the half record 62*a* contains the highest key signal, the key counter is incremented and the contents of the key counter gives the desired head number for insertion into the head address area 31*e* shown in FIG. 2*d*. However, when the desired key signal is in the overflow half record 62*b*, an OVERFLOW TRACK signal is generated on a line 72 shown in FIG. 1. A READ OP is immediately performed in response to a signal present on a line 74 reading the contents of the area 64 shown in FIG. 2*c* into the head area 31*e*. The associated CPU responds to the OVERFLOW TRACK signal on the line 72 to generate the READ OP on the line 74 by techniques well known in the art.

Figure 3:
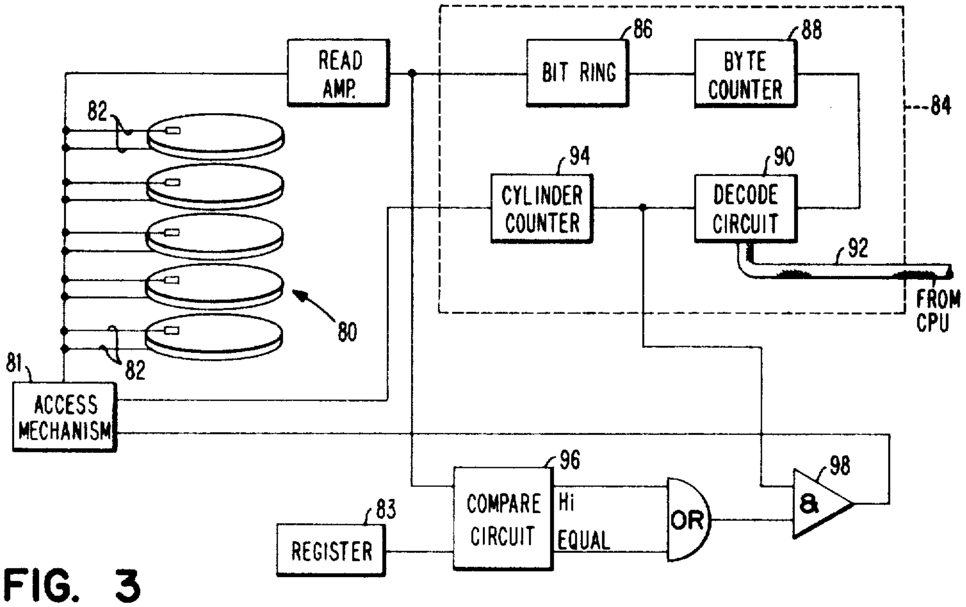
FIG. 3 is a block diagram of a second embodiment of the instant invention.

Referring to FIG. 3, a second embodiment of the novel indexing arrangement is shown employing a single storage unit 80 for storing certain or all of the various indices in addition to the records themselves. A suitable storage unit 80 can be identified as an IBM type 2311 (Disk Storage Drive). As hereinbefore mentioned, the unit 80 comprises ten disk surfaces and each surface comprises two hundred tracks. Correspondingly numbered tracks on each surface are collectively called a cylinder.

Employing the earlier described indexing concepts, the second embodiment employs a first level or cylinder index which contains the highest key signal for each cylinder contained in the unit 80. Therefore in operation, an access mechanism 81 of the unit 80 would position its associated reading heads 82 on cylinder zero and read the sequentially positioned key signals. Concurrently, the desired key signal which is in a register 83 is compared byte by byte with the key signals read from cylinder zero. Means 84 are provided for counting the records compared until a successful search high or equal compare operation is performed. The means 84 selected for description is simply a bit ring 86 which identifies the reading of each byte. The unit 80 is a serial unit and each byte contains eight bits. Therefore after a count of eight, an output pulse is applied to a byte counter 88. A parallel recording system or any other variation could obviously be equipped with a suitable byte recognition circuit such as the bit counter 86. A decode circuit 90 which is settable by signals from the associated CPU over an input bus 92, identifies the reading of a complete key signal from cylinder zero. The output signal from the decode circuit 90 advances a cylinder counter 94 and tests the output of a compare circuit 96 by applying an enabling pulse to an AND gate 98. The AND gate 98 has a second enabling input from the compare circuit 96 when the key signals from the register 83 and the storage unit 80 are high or equal. The output signal from the AND gate 98 indicates that the desired cylinder has been found and its address is the contents of the cylinder counter 94. The contents of the cylinder counter are transferred to the access mechanism 81 whereby the mechanism 81 would position the reading heads to the cylinder identified thereby.

Again, surface or head zero is read in a similar manner seeking a successful compare high or equal operation. Surface zero now contains a track index or highest key signal of each record on each track in the cylinder. This time the contents of the counter 84 identify the correct reading head to select in the already selected cylinder. This is accomplished by electrically switching among the heads 82. A standard search on key operation would then be performed on the identified track for the desired record.

A further variation of this embodiment is to place the track index with its corresponding key signal in the cylinder index. This modification would require a corresponding change in the counting scheme whereby the cylinder counter would advance every eleven records and the track counter would start at a minus one position in synchronism with the cylinder counter.

Figure 4:
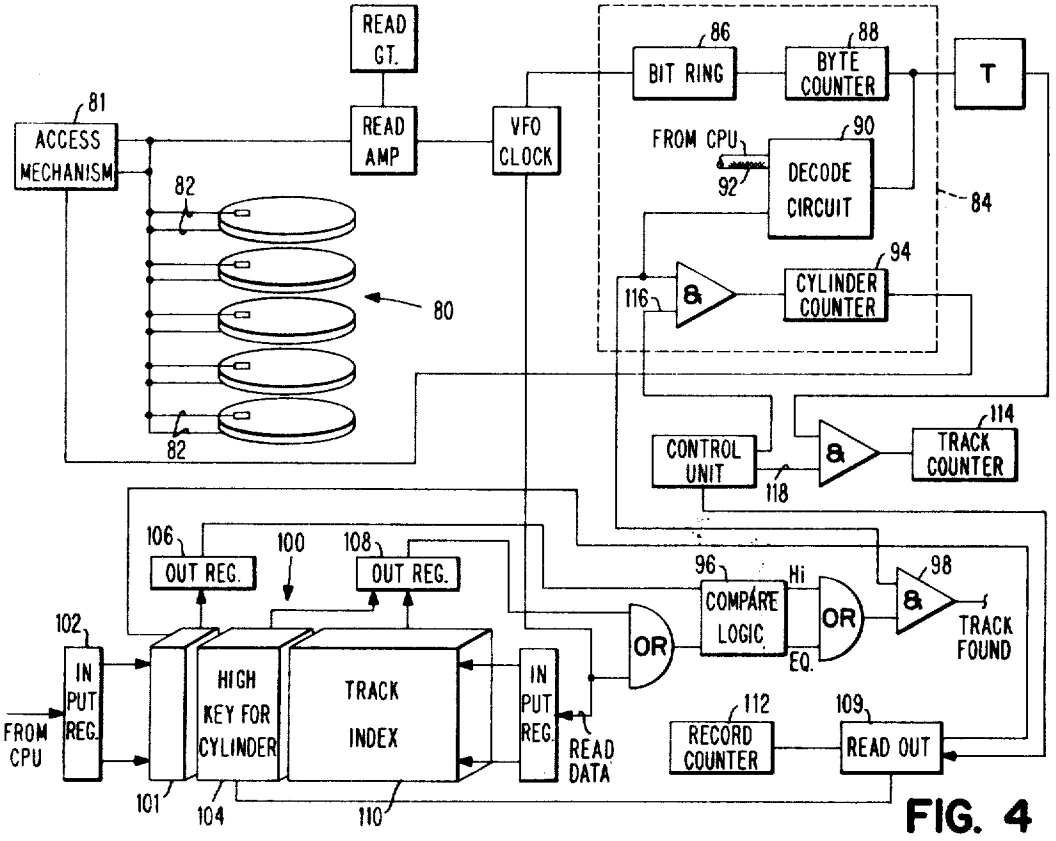
FIG. 4 is a block diagram of a further embodiment of the instant invention.

Referring to FIG. 4, there can be seen a further embodiment of the instant invention which comprises a core memory 100 as a means for increasing the operating speed of the present invention and as a means for proving an additional advantage of retaining a group of key signals in which there is a relatively high probability that the desired key signal will be located.

The associated CPU transfers the key signal associated with the record being sought to a section 101 in the core memory 100 by an input register 102. If sufficient core memory sections are unavailable a register can be employed for this special purpose task. An additional section 104 of the core memory 100 contains the high key signal for the cylinder presently under the reading heads 82 and the key signal for the next succeeding lower cylinder number. A separate read out register 106 and 108 are responsive to the contents of the sections 101 and 104 respectively. Means 109 is employed to read out the key signal from portion 101 in synchronism with the key signals in portion 104. If a successful search high or equal is completed on the highest key signal in the present cylinder, i.e., that over which the heads 82 are presently positioned, a comparison operation is performed with the key signal in the portion 101 and each key signal in a track index held in a further portion 110. The track index comprises the highest key signals for nine of the ten tracks comprising a cylinder. The function of the remaining track is described hereinafter. In this manner the correct head is found by counting the number of comparisons required before a high or equal comparison is achieved. This number designates the magnetic head which will read the desired key signal and its associated data record and is held in a counter 112 which increments one position for each time the desired key signal is read from the portion 110. The same operation is then performed on the key signal for the present cylinder minus one.

When the comparison operation with the high key for the present cylinder and the present cylinder minus one proves unsuccessful, the access mechanism for the unit 80 is only then moved to cylinder zero surface zero which contains the indices for the device. This track contains records in blocked format comprising all the high keys for each cylinder. A search is initiated in this index and the record counting means 84 indicates which cylinder holds the desired key signal. The access mechanism 81 moves the heads 82 to this cylinder and the head associated with surface zero is activated whereby the nine records contained thereon are read. As mentioned before, these nine records are the high key signal for the remaining nine tracks comprising the cylinder. As the comparison operation between the desired key signal and each of these nine records is performed, the nine records are read into the portion 110 of the core memory 100 in preparation for the next key search operation. A successful comparison indicates the desired track upon which the key signal and its associated record is located. A track counter 114 connected in parallel with the cylinder counter 94 now holds the address of the desired track. Selection is made between counters 94 and 114 by the presence of an enabling signal on lines 116 and 118 respectively, which signals are generated in response to a stored program or in response to hardware circuits indicating the present mode of operation of the device.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with a programmed data processor of the type operating to process records comprising at least a key signal field and an associated data signal field and wherein the key signal comprises numeric characters or alphabetic characters or a combination of both numeric and alphabetic characters, a data storage system comprising, a first data storage area having a plurality of storage subdivisions and each of said subdivisions being employed for storing a plurality of the records, the records being sequentially stored in said subdivisions according to order of their respective key signals, a second data storage area having a plurality of storage locations and each storage location storing an indexing key signal associated with one of said subdivisions, first means including position determining means for searching said second data storage area for an indexing key signal, and second means responsive to said position determining means for identifying one of said subdivisions.

2. A data storage system as recited in claim 1, wherein said second means generates first address indicia of a corresponding subdivision and further includes, accessing means responsive to said first address indicia for locating said identified subdivision, and third means for searching said plurality of records in said identified subdivision for a desired record.

3. A data storage system as recited in claim 1, wherein said second data storage area comprises, a first storage sub-area having a plurality of storage locations containing first level indexing indicia and second address indicia, said first means now being employed for searching said first level indexing indicia for a desired index signal and for retrieving said second address indicia associated with said index signal, said second address indicia being employed to specify one of said subdivisions in said first data storage area.

4. A data storage system as recited in claim 1, wherein said second data storage area comprises, a first storage sub-area having a plurality of storage locations containing first level indexing indicia, said first means being employed for searching said first level indexing indicia for a desired index signal, and said second means includes counting means which count each record during said search for identifying one of said subdivisions.

5. In combination with a programmed data processor of the type operating to process records comprising at least a key signal field and a data signal field and wherein the key signal comprises numeric characters or alphabetic characters or a combination of both numeric and alphabetic characters, a data storage system comprising, a first data storage area having a plurality of storage subdivisions and each of said subdivisions being employed for storing a plurality of records, certain of said subdivisions being arranged together and forming a plurality of groups, the records being sequentially stored in said subdivisions and in said groups according to order of their respective key signals, first means responsive to address indicia for identifying and selectively accessing to said groups, a second data storage area having a plurality of storage locations for storing indexing manifestations comprising at least key signals, second means including position determining means for searching said second data storage area for a key signal, and third means responsive to said position determining means for deriving said address indicia of one of said groups in which a desired record is stored.

6. A data storage system as recited in claim 5, wherein said first data storage area is integral with said second data storage area.

7. A data storage system as recited in claim 5, wherein said indexing manifestations further include address indicia associated with each key signal, and said third means being operable to read said address indicia associated with a desired key signal and to transfer said address indicia to said first means.

8. A data storage system as recited in claim 5, wherein certain of said groups are arranged into a plurality of sections, said second data storage area being divided into a first portion for storing indexing manifestations which identify each of said sections and a second portion for storing indexing manifestations which identify each group within each of said sections, said third means obtains a first part of said address indicia during the searching of said first portion and a second part of said address indicia during the searching of said second portion, and said first means being responsive to said first part of said address indicia for accessing one of said sections and to said second part of said address indicia for accessing to one of said groups.

9. In combination with a programmed data processor of the type operating to process records comprising at least a key signal field and a data signal field and wherein the key signal comprises numeric characters or alphabetic characters or a combination of both numeric and alphabetic characters, a data storage systems comprising, a first data storage area having a plurality of storage subdivisions and each of said subdivisions being employed for storing a plurality of records, certain of said subdivisions being arranged together and forming a plurality of groups and certain of said groups being arranged together and forming a plurality of sections, the records being sequentially stored in said subdivisions according to order of their respective key signals, first means responsive to address indicia for identifying and selectively accessing to said sections and to said groups.

said address indicia being divisible into separate parts, a second data storage location having a first portion and a second portion and said second portion having a plurality of positions, said first portion having a plurality of storage locations for storing first indexing manifestations comprising at least the highest order key signal in each of said sections, each of said positions being associated with a corresponding key signal in said first portion and each position being employed to store second indexing manifestations comprising at least the highest order key signal in each of said groups in its corresponding sections, second means for comparing a desired key signal with said key signals in said first portion, third means responsive to said second means for generating a first part of said address indicia and for selecting said corresponding position in said second portion, fourth means for comparing a desired key signal with said key signals in said selected position, and fifth means responsive to said fourth means for generating a second part of said address indicia.

10. A data storage system as recited in claim 9, wherein said first and said second indexing manifestations further include address indicia associated with each key signal, said second means and said fourth means further include sixth means and seventh means respectively for reading said address indicia, and eighth means for transferring said address indicia to said first means.

11. A data storage system as recited in claim 9, wherein said first indexing manifestations further include address indicia associated with each key signal, said second means further includes sixth means for reading said address indicia and for transferring said address indicia to said first means, and said fifth means comprises a counting means for counting each separate comparison operation.

References Cited

UNITED STATES PATENTS

| | | | |
|---|---|---|---|
| 3,366,928 | 1/1968 | Rice et al. | 340—172.5 |
| 3,344,405 | 9/1967 | Craft et al. | 340—172.5 |
| 3,317,899 | 5/1967 | Chien et al. | 340—172.5 |
| 3,311,887 | 3/1967 | Muroga | 340—172.5 |
| 3,303,477 | 2/1967 | Voigt | 340—172.5 |
| 3,243,786 | 3/1966 | Davies | 340—173.1 |
| 3,183,489 | 5/1965 | Laurer et al. | 340—172.5 |
| 3,167,003 | 1/1965 | Taylor et al. | 101—93 |
| 3,141,152 | 7/1964 | Greene et al. | 340—172.5 |
| 2,796,218 | 6/1957 | Tootill et al. | 235—61 |
| 2,773,444 | 12/1956 | Whitney | 101—93 |

GARETH D. SHAW, *Primary Examiner.*